US012086678B2

(12) United States Patent
Gurevich et al.

(10) Patent No.: US 12,086,678 B2
(45) Date of Patent: Sep. 10, 2024

(54) COMPACT DIFFRACTIVE OPTICAL ELEMENT LASER AIMING SYSTEM

(71) Applicant: ZEBRA TECHNOLOGIES CORPORATION, Lincolnshire, IL (US)

(72) Inventors: Vladimir Gurevich, Great Neck, NY (US); David T. Shi, Setauket, NY (US); Chinh Tan, East Setauket, NY (US); Courtney L. Watson, Manorville, NY (US); Carl D. Wittenberg, Water Mill, NY (US)

(*) Notice: Subject to any disclaimer, the term of this patent is extended or adjusted under 35 U.S.C. 154(b) by 755 days.

(21) Appl. No.: 17/333,628

(22) Filed: May 28, 2021

(65) Prior Publication Data

US 2022/0383011 A1    Dec. 1, 2022

(51) Int. Cl.
  *G06K 7/10*     (2006.01)
  *G02B 27/30*   (2006.01)
  *G06K 7/14*     (2006.01)

(52) U.S. Cl.
  CPC ......... *G06K 7/10831* (2013.01); *G02B 27/30* (2013.01); *G06K 7/10712* (2013.01); *G06K 7/10881* (2013.01); *G06K 7/1408* (2013.01)

(58) Field of Classification Search
  CPC .......... G06K 7/10831; G06K 7/10712; G06K 7/10881; G06K 7/1408; G02B 27/30
  See application file for complete search history.

(56) References Cited

U.S. PATENT DOCUMENTS

| | | | | |
|---|---|---|---|---|
| 9,378,402 | B2* | 6/2016 | Duan | G06K 7/10732 |
| 9,798,911 | B1* | 10/2017 | Handshaw | G06K 7/10722 |
| 10,067,355 | B1* | 9/2018 | Handshaw | G06K 7/10831 |
| 10,223,563 | B2* | 3/2019 | Powell | G06K 7/089 |
| 10,488,518 | B2* | 11/2019 | Geiger | G01S 7/4813 |
| 10,853,603 | B2* | 12/2020 | Powell | H02J 7/0045 |
| 10,969,659 | B2* | 4/2021 | Park | G03B 17/02 |
| 10,970,503 | B2* | 4/2021 | Wittenberg | H04N 23/51 |
| 11,200,391 | B2* | 12/2021 | Utykanski | G06K 7/10722 |
| 11,301,655 | B2* | 4/2022 | Lozano | G06K 7/1417 |
| 11,334,733 | B1 | 5/2022 | Vinogradov et al. | |
| 11,361,179 | B2* | 6/2022 | Powell | G06K 7/0004 |
| 11,734,529 | B2* | 8/2023 | Gurevich | G02B 19/0061 235/454 |
| 11,775,783 | B1* | 10/2023 | Gurevich | G06K 7/10811 235/462.22 |
| 11,790,197 | B2* | 10/2023 | Gurevich | G06K 7/10881 235/454 |

(Continued)

OTHER PUBLICATIONS

International Search Report and Written Opinion for International Application No. PCT/US2022/30310 mailed on Oct. 5, 2022.

*Primary Examiner* — Bao-Luan Q Le
(74) *Attorney, Agent, or Firm* — Yuri Astvatsaturov

(57) ABSTRACT

An aiming system for use in a small height scan engine chassis. The aiming system includes a beam source assembly generating an input beam along a central axis and a collimator assembly having a lens group that defines a tilt axis having a tilt angle, α, relative to the central axis, to deflect the input beam from the central axis onto the tilt axis. The collimator assembly further includes a recess within which a diffractive optical element is sealably mounted to convert the deflected input beam into an aiming pattern at a focal distance of the lens group.

30 Claims, 16 Drawing Sheets

(56) References Cited

U.S. PATENT DOCUMENTS

| | | | |
|---|---|---|---|
| 2002/0139853 A1 | 10/2002 | Tsikos et al. | |
| 2015/0097035 A1* | 4/2015 | Duan | G06K 7/10732 |
| | | | 235/462.21 |
| 2015/0317503 A1* | 11/2015 | Powell | H02J 7/0045 |
| | | | 235/455 |
| 2017/0293785 A1* | 10/2017 | Handshaw | G06K 7/1413 |
| 2018/0149751 A1* | 5/2018 | Geiger | G01S 17/36 |
| 2019/0197271 A1* | 6/2019 | Powell | G06K 7/10831 |
| 2019/0228195 A1* | 7/2019 | Lozano | H04N 23/671 |
| 2019/0258141 A1* | 8/2019 | Park | H04N 23/90 |
| 2019/0318142 A1* | 10/2019 | Tan | G06K 7/10881 |
| 2019/0362117 A1 | 11/2019 | Handshaw et al. | |
| 2020/0134273 A1* | 4/2020 | Wittenberg | H04N 23/51 |
| 2020/0334432 A1* | 10/2020 | Utykanski | G06K 7/0004 |
| 2021/0081628 A1* | 3/2021 | Powell | H02J 7/0045 |
| 2021/0149289 A1* | 5/2021 | Feng | G03B 17/245 |
| 2021/0159664 A1 | 5/2021 | Liu et al. | |
| 2022/0309263 A1* | 9/2022 | Gurevich | G02B 3/0043 |
| 2023/0114004 A1* | 4/2023 | Gurevich | G02B 7/28 |
| | | | 235/454 |
| 2023/0385576 A1* | 11/2023 | Gurevich | H04N 23/58 |

\* cited by examiner

COMPACT DIFFRACTIVE OPTICAL ELEMENT LASER AIMING SYSTEM

BACKGROUND

Industrial scanners and/or barcode readers may be used in warehouse environments and/or other similar settings. These scanners may be used to scan barcodes and other objects. Such scanners are typically contained within a chassis to ensure optical components are protected from bumps, falls, and/or other potentially damaging events. In some environments, high powered scanners capable of scanning or resolving barcodes (e.g., 100 ml wide) across a wide range of distances, such as from a few inches to tens of feet, or more, may be desirable. Such systems require larger optics (e.g., imaging lens systems greater than approximately 6 mm in overall diameter) in order to meet performance requirements, but there remains a compromise between the lens system having a specific size while being constrained by the overall dimensions of the housing and the chassis. Also, compact imaging systems require high precision alignment of optics to prevent optical distortion, which can result in reduced efficiency of scanning rates, or faulty equipment. Further, larger systems may generate larger mechanical securing forces that could potentially damage the chassis or other components.

Accordingly, there is a need for improved accessories having improved functionalities.

SUMMARY

In accordance with a first aspect, an aiming system includes a beam source assembly having a mounting plate and a beam source for generating an input beam from an exit surface, the exit surface defining a central axis along which the input beam is to propagate. The aiming system further includes a collimator assembly having a body defining an outer surface and an inner surface parallel thereto. The collimator assembly further has a lens group disposed between the outer surface and the inner surface, where the lens group defines a tilt axis forming an acute angle to the parallel outer and inner surfaces and wherein the tilt axis has a tilt angle, $\alpha$, relative to the central axis, the lens group positioned to deflect the input beam from the central axis onto the tilt axis. The collimator assembly further has a recess positioned above the lens group and has an optical element sealably mounted within the recess to convert the input beam into an aiming pattern at a focal distance of the lens group. The aiming system further has a chassis defining an outer cavity within which the collimator assembly is mounted and an inner cavity within which beam source is mounted.

In a variation of this embodiment, the lens group comprises first and second symmetric aspheric lens. In another variation, the lens group comprises an aspheric lens at an exit end and a tilted planar face at an entrance end. In another variation, a double convex lens. In various examples, the lens group is integrally formed from the body of the collimator assembly.

In some examples, the angle, $\alpha$, is defined as $\alpha > 0.5 * a\tan(h/F)$, where F is a focal length of the lens group of the collimator and h is a clearance height of the beam source.

In some examples, the optical element is a diffractive optical element. In various examples of these, different optical element has a planar outer surface and a diffractive element inner surface positioned to receive the input beam from the lens group. In other examples, the optical element is a refractive optical element.

In some examples, the collimator assembly further has a beam forming aperture positioned in the recess, and where the optical element is sealably mounted to the beam forming aperture. In some such examples, the beam forming aperture is centered on the central axis.

In some examples, the collimator assembly further has an optical element retainer affixed to the outer surface of the body of the collimator assembly. In some examples, the collimator assembly has a height of 2.5 mm or less. In some examples, the collimator assembly has a height of 2.2 mm.

In some examples, the body of the collimator assembly is centered on the central axis.

In some examples, the beam source assembly is mounted to a chassis mounting portion to extend into the inner cavity.

In some examples, the chassis has a height of 7 mm to 7.5 mm.

In accordance with a second aspect, a method of assembling an aiming system for generating an aiming pattern on an object in a field of view (FOV) is provided. The method includes providing a collimator assembly having a body defining an outer surface and an inner surface parallel thereto, the collimator assembly further having a lens group between the outer surface and the inner surface, wherein the lens group defines a tilt axis forming an acute angle to the parallel outer and inner surfaces, the collimator assembly further having a recess extending from the outer surface. The method further includes positioning an optical element in the recess and sealing the optical element in the recess to create a hermetic seal with the lens group, the optical element to convert an input beam into an aiming pattern at a focal distance of the lens group. The method further includes positioning the collimator assembly above a beam source assembly to generate the input beam from a beam source, the beam source defining a central axis such that the input beam from the beam source is deflected from the central axis to the tilt axis by the lens group, wherein the tilt axis has a tilt angle, $\alpha$, relative to the central axis and mounting the collimator assembly and the beam source assembly to a chassis.

In a variation of this embodiment, the method further includes prior to positing the optical element in the recess, positioning a beam forming aperture at a bottom of the recess, the method further comprising sealing the optical element against the beam forming aperture.

In some examples, the method includes affixing an optical element retainer to the outer surface of the body.

In some examples, positioning the collimator assembly above the beam source assembly to generate the input beam includes providing the chassis defining an outer cavity having a mounting portion and an inner cavity opposite the outer cavity; affixing the collimator assembly within the outer cavity to the mounting portion; and affixing the beam source within the inner cavity.

In some examples, the method further includes actively aligning the collimator assembly above the beam source assembly by: with the beam source affixed within the inner cavity, adjusting the position of the collimator assembly in a z-axis direction, in an x-axis direction, and/or in a y-axis direction during generation of the input beam until a sufficient output beam condition is met; and affixing the collimator assembly at the resulted adjusted position.

In some examples, where the beam source assembly is mounted to a mounting plate of the chassis at an entrance end of the inner cavity.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
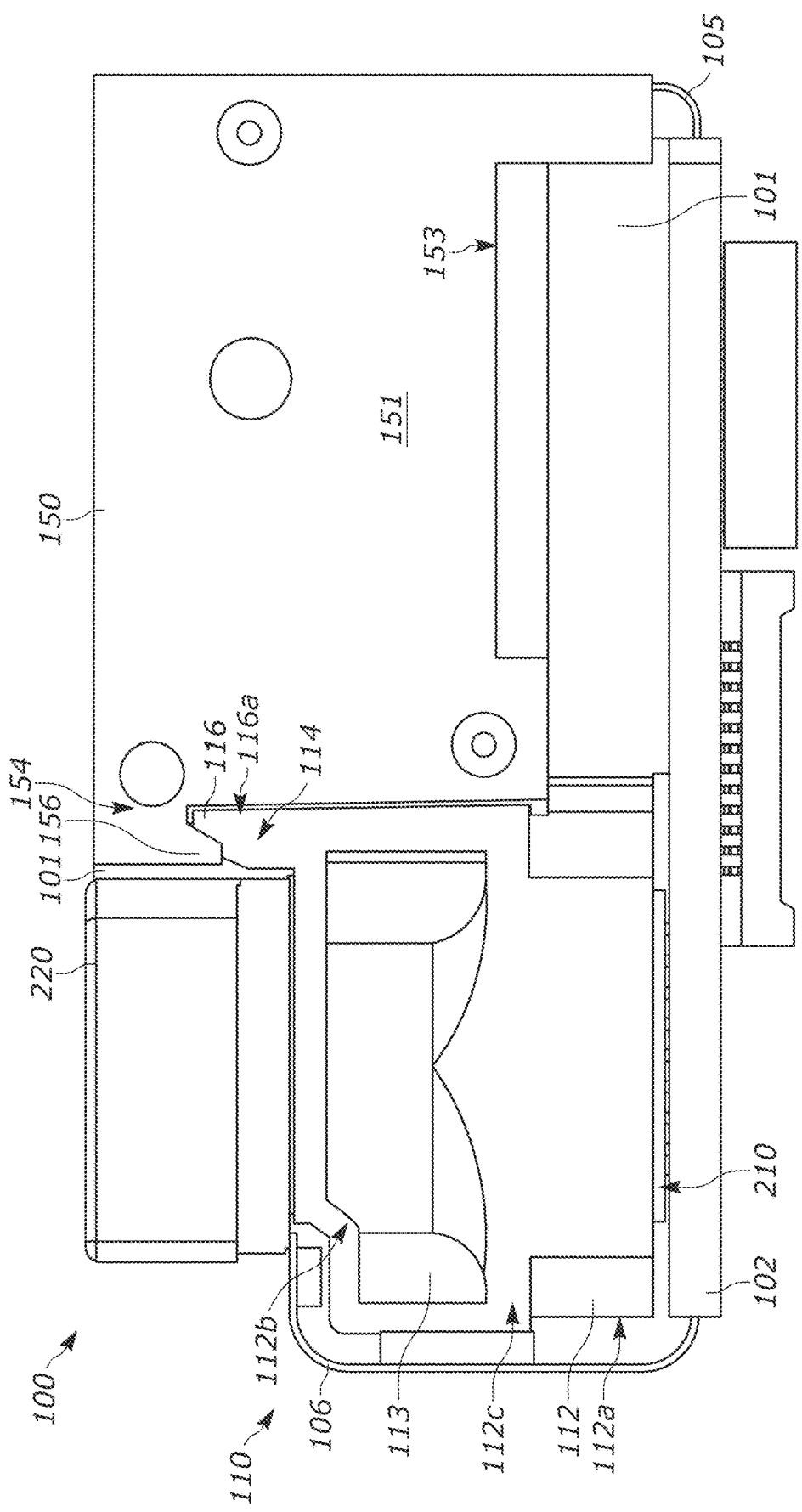
FIG. 1 illustrates a front elevation view of an example imaging assembly of an example scanner for capturing images of an object in accordance with various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Generally speaking, pursuant to these various embodiments, a high-performance autofocus barcode scanner is provided having reduced dimensional requirements, and a broad range of autofocus distances. More specifically, the scanners described herein may be operably coupled with a support chassis while still utilizing all of the available height within the scanner housing. By positioning the imaging lens system adjacent to the chassis (as compared with within the chassis), the imaging lens system is not constrained by an upper height (i.e., a vertical) dimension of the chassis, and as such, can be dimensioned to occupy the entire vertical dimension. As such, the scanner may incorporate larger, higher-powered optical units capable of resolving barcodes disposed at greater distances, and greater ranges of distances, from the scanner. The scanner also incorporates optical alignment features that provide very high precision alignment of the imaging optics allowing for the use of smaller, more compact, lenses and optical elements. Further still, the scanner incorporates aiming units that generate aiming beams or aiming patterns using a compact, low-profile assembly that protects the aiming unit against detrimental back reflections of the aiming beam, back reflections that can otherwise flash blow out compact scanners.

Turning to the figures, an assembly 100 or scan engine for capturing at least one image of an object appearing in an imaging field of view (FOV) is provided. The assembly 100 includes a circuit board 102, an imaging system 110 operably coupled with the circuit board 102, and a chassis 150. Further, in some examples, the system 100 may include an aiming system 170 and an illumination system 180, as well as any number of additional components used to assist with capturing an image or images of an object.

The circuit board 102 may include any number of electrical and/or electro-mechanical components (e.g., capacitors, resistors, transistors, power supplies, etc.) used to communicatively couple and/or control various electrical components of the assembly 100. For example, the circuit board 102 may include any number of component mounting portions 103, illustrated in FIG. 2, to receive components (e.g., the imaging system 110) to operably couple therewith, and may additionally include a board mounting region 104 used to secure the circuit board 102 with the scanner housing (not illustrated). In the example illustrated in FIG. 2, the circuit board 102 further includes a first flex tail connector 105 and a second flex tail connector 106. As will be discussed, the first flex tail connector 105 is used to communicatively couple components disposed within the chassis 150 with the circuit board 102, and the second flex tail connector 106 is used to communicatively couple the circuit board 102 with portions of the imaging system 110.

The imaging system 110 is also operably coupled with the circuit board 102. The imaging system 110 includes an autofocus system 110 and a rear lens holder 112, both containing lenses for imaging. The autofocus system 220 is positioned adjacent to and/or operably coupled with the rear lens holder 112. The rear lens holder 112 is in the form of a generally hollow body that defines a lower portion 112a, an upper portion 112b, and a sidewall 112c extending between the lower and upper portions 112a, 112b. The rear lens holder 112 may have any number of features such as shapes and/or cutouts 113 such that the sidewall 112c has a generally uniform thickness despite its unique shape that corresponds to the shape of the lens or lenses disposed therein. These cutouts 113 reduce overall weight of the rear lens holder 112, and due to the uniform thickness of the sidewall 112c, the rear lens holder 112 is easier to manufacture (e.g., mold via an injection molding machine) as compared with lens holders having varying thickness.

In some examples, the rear lens holder 112 is coupled with the circuit board 102 via the component mounting portion 103. As a non-limiting example, the component mounting portion 103 may be in the form of a pad to which the lower portion 112a of the rear lens holder 112 is pressed onto. The component mounting portion 103 may include an adhesive to assist in securing the rear lens holder 112 to the circuit board 102. In other examples, the component mounting portion 103 may include any number of electrical interconnects that receive corresponding electrical interconnects disposed or otherwise coupled with the rear lens holder 112. Other examples are possible.

Figure 2:
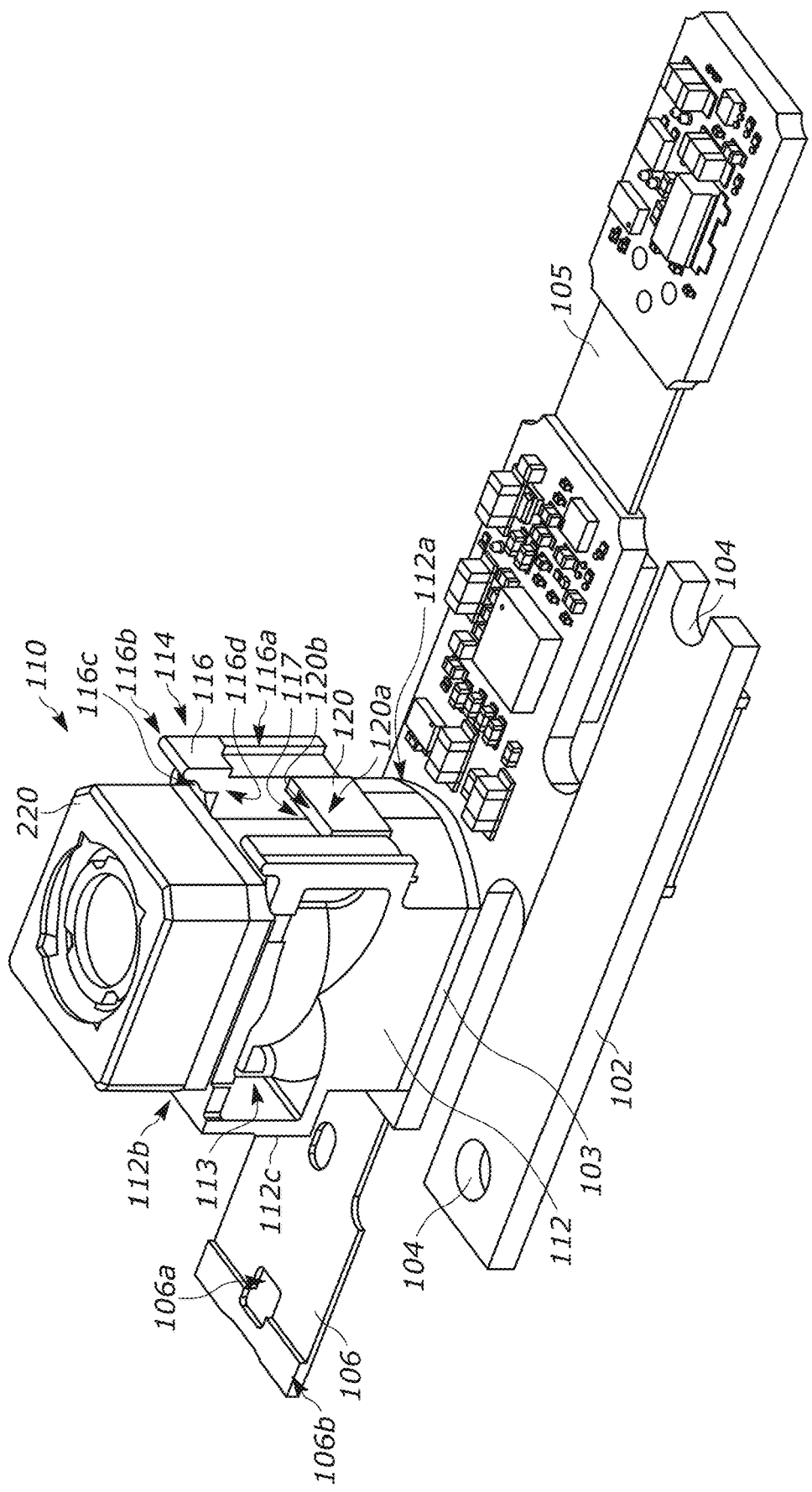
FIG. 2 illustrates a perspective view of the example imaging assembly of FIG. 1 in accordance with various embodiments.
Figure 3:
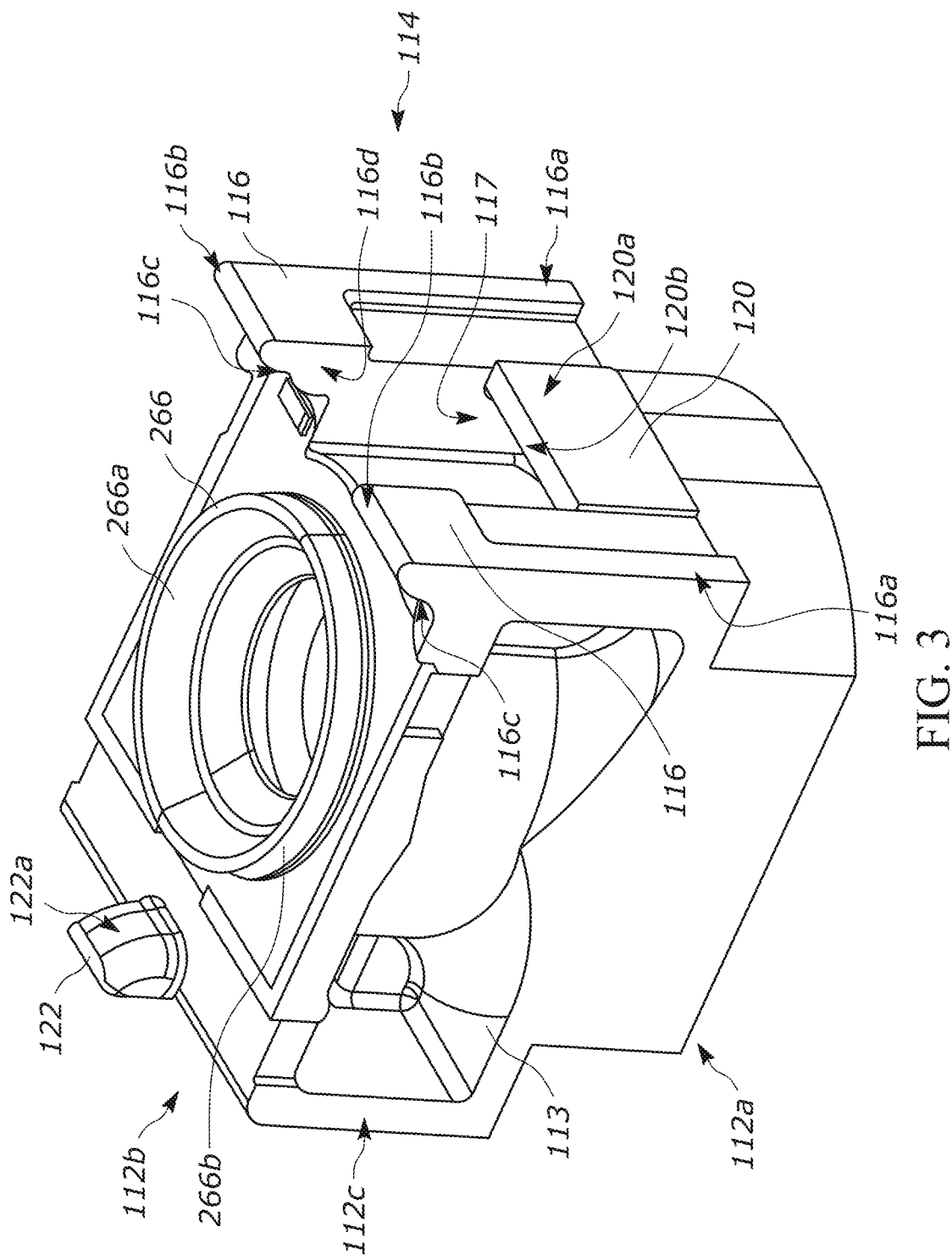
FIG. 3 illustrates a perspective view of an example lens holder for use with the example imaging assembly of FIGS. 1 & 2 in accordance with various embodiments.

The rear lens holder 112 further includes a lens holder mounting portion 114 positioned on an outer periphery of the sidewall 112c. The lens holder mounting portion 114 includes any number of upper tabs 116 and any number of lower tabs 120. As illustrated in FIG. 2, each of the upper tabs 116 includes a generally planar facing surface 116a, a curved upper surface 116b positioned adjacent to the facing surface 116a, an angled surface 116c positioned adjacent to the curved upper surface 116b, and an inner sidewall 116d positioned adjacent to the facing surface 116a, the curved upper surface 116b, and the angled surface 116c. In the illustrated example, the respective inner sidewalls 116d of each of the upper tabs 116 are arranged such that they face each other. The angled surface 116c is a generally planar surface that forms an angle relative to the facing surface 116a of approximately 30°. However, other examples of suitable angles are possible.

Each of the upper tabs 116 are separated by a cavity 117 at least partially defined by the inner sidewall 116d. The cavity 117 is further defined by the lower tab 120, which includes a generally planar facing surface 120a, an upper surface 120b positioned adjacent to the facing surface 120a, and an angled surface 120c positioned adjacent to the upper surface 120b. The angled surface 120c is a generally planar surface that forms an angle relative to the facing surface 120a of approximately 30°. However, other examples of suitable angles are possible. Further, while the upper surface 120b of the lower tab 120 is illustrated as a generally planar surface, in some examples, the upper surface 120b of the lower tab 120 may be curved. So configured, the cavity 117 is at least partially defined by the inner sidewalls 116d of the upper tabs 116, the sidewall 112c, and the angled surface 120c of the lower tab 120. In some examples, the width of the cavity 117 may gradually decrease from the upper portion 112b to the lower portion 112a.

The chassis 150 may be constructed from a rigid material such as a metal or metal alloy (e.g., zinc). The chassis 150 includes a body 151 that defines any number of cavities 152 in which components may be partially or fully disposed. For example, the aiming system 170 and/or the illumination system 180 may be at least partially disposed within the cavity 152 of the chassis 150. The aiming system 170 may include components to generate a cosmetic pattern to assist with identifying where the imaging system 110 is aiming. In some examples, the aiming system 170 may include laser and/or light emitting diode ("LED") based illumination sources. The illumination system 180 assists with illuminating the desired target for the imaging system 110 to accurately capture the desired image. The illumination system 180 may include a LED or an arrangement of LEDS, lenses, and the like. For the sake of brevity, the aiming system 170 and the illumination system 180 will not be described in substantial detail.

The body 151 of the chassis 150 may include a recessed portion 153 that is adapted to receive a portion of the first flex tail connector 105 (e.g., a sub-board or an interconnect member). The chassis 150 further includes a chassis mounting portion 154 disposed or positioned on an outer periphery of the body 151 of the cavity 150. The chassis mounting portion 154 includes a reference surface 155, any number of upper hooks 156, and any number of lower hooks 160.

Figure 4:
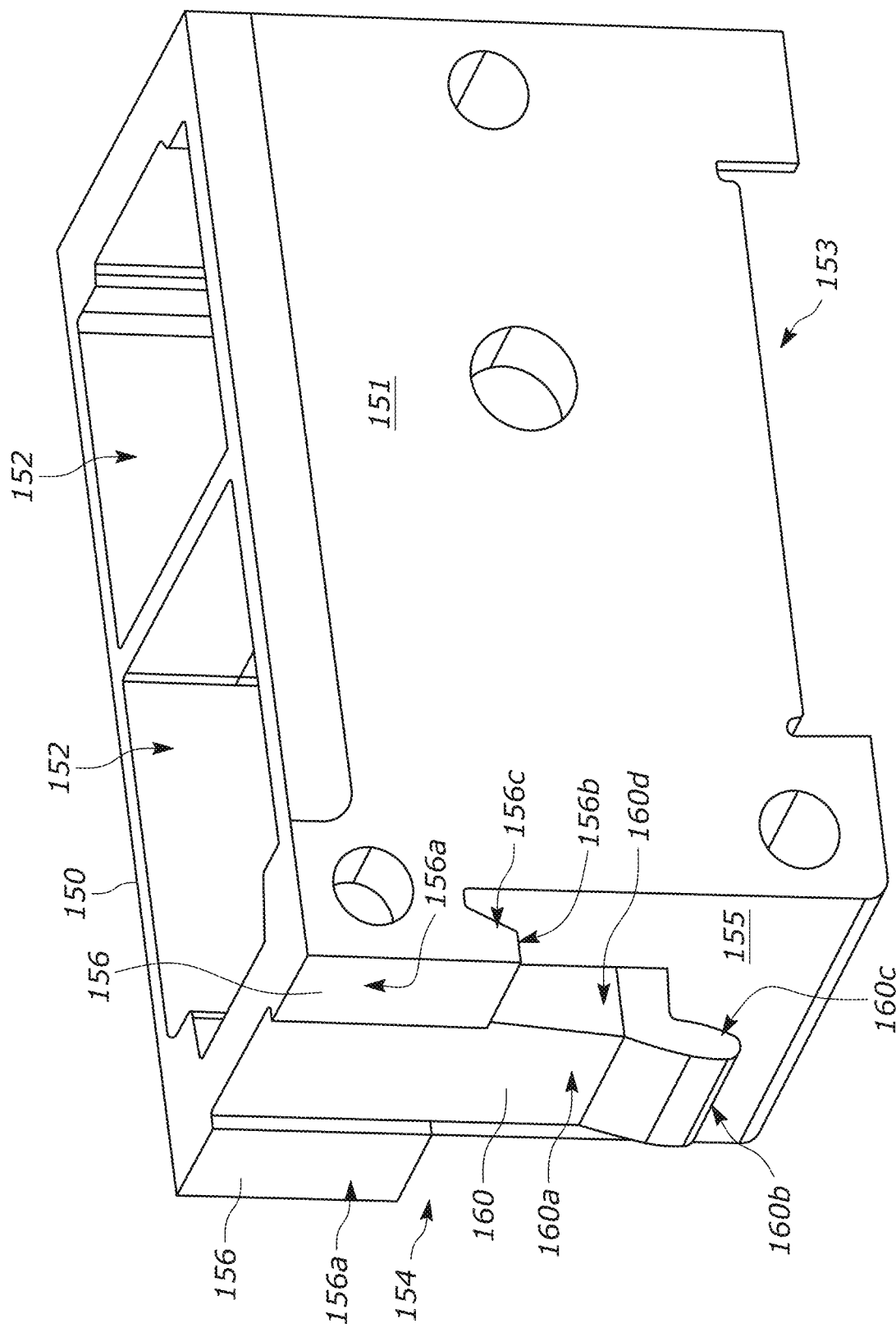
FIG. 4 illustrates a perspective view of an example chassis for use with the example imaging assembly of FIGS. 1 & 2 in accordance with various embodiments.

As illustrated in FIG. 4, each of the upper hooks 156 includes a generally planar facing surface 156a, a lower surface 156b (which, in some examples, may be curved) positioned adjacent to the facing surface 156a, and an angled surface 156c positioned adjacent to the lower surface 156b. The angled surface 156c is a generally planar surface that forms an angle relative to the facing surface 156a of approximately 30°. However, other examples of suitable angles are possible. Notably, and as will be discussed in further detail below, the angled surface 156c of the upper hooks 156 is configured to abut the corresponding angled surface 116c of the upper tabs 116 of the lens holder mounting portion 114. Similarly, the angle formed between the angled surface 156c and the facing surface 156a is adapted to correspond to the angle formed between the angled surface 116c and the facing surface 116a of the upper tabs 116.

As with the upper hooks 156 of the chassis mounting portion 154, the lower hook 160 of the chassis mounting portion 154 includes a generally planar facing surface 160a, a curved lower surface 160b positioned adjacent to the facing surface 160a, an angled surface 160c positioned adjacent to the lower surface 160b, and outer sidewalls 160d. The angled surface 160c is a generally planar surface that forms an angle relative to the facing surface 160a of approximately 30°. However, other examples of suitable angles are possible. Notably, and as will be discussed in further detail below, the angled surface 160c of the lower hook 160 is configured to abut the corresponding angled surface 120c of the lower tab 120 of the lens holder mounting portion 114. Similarly, the angle formed between the angled surface 160c and the facing surface 160a is adapted to correspond to the angle formed between the angled surface 120c and the facing surface 120a of the lower tab. As illustrated in FIG. 4, the lower hook 160 protrudes outwardly from the reference surface 155. Further, the lower hook 160 may have a width that corresponds to the width of the cavity 117. In examples where the cavity 117 has a reducing or tapered width, the width of the lower hook 160 may also be similarly tapered.

Figure 5:
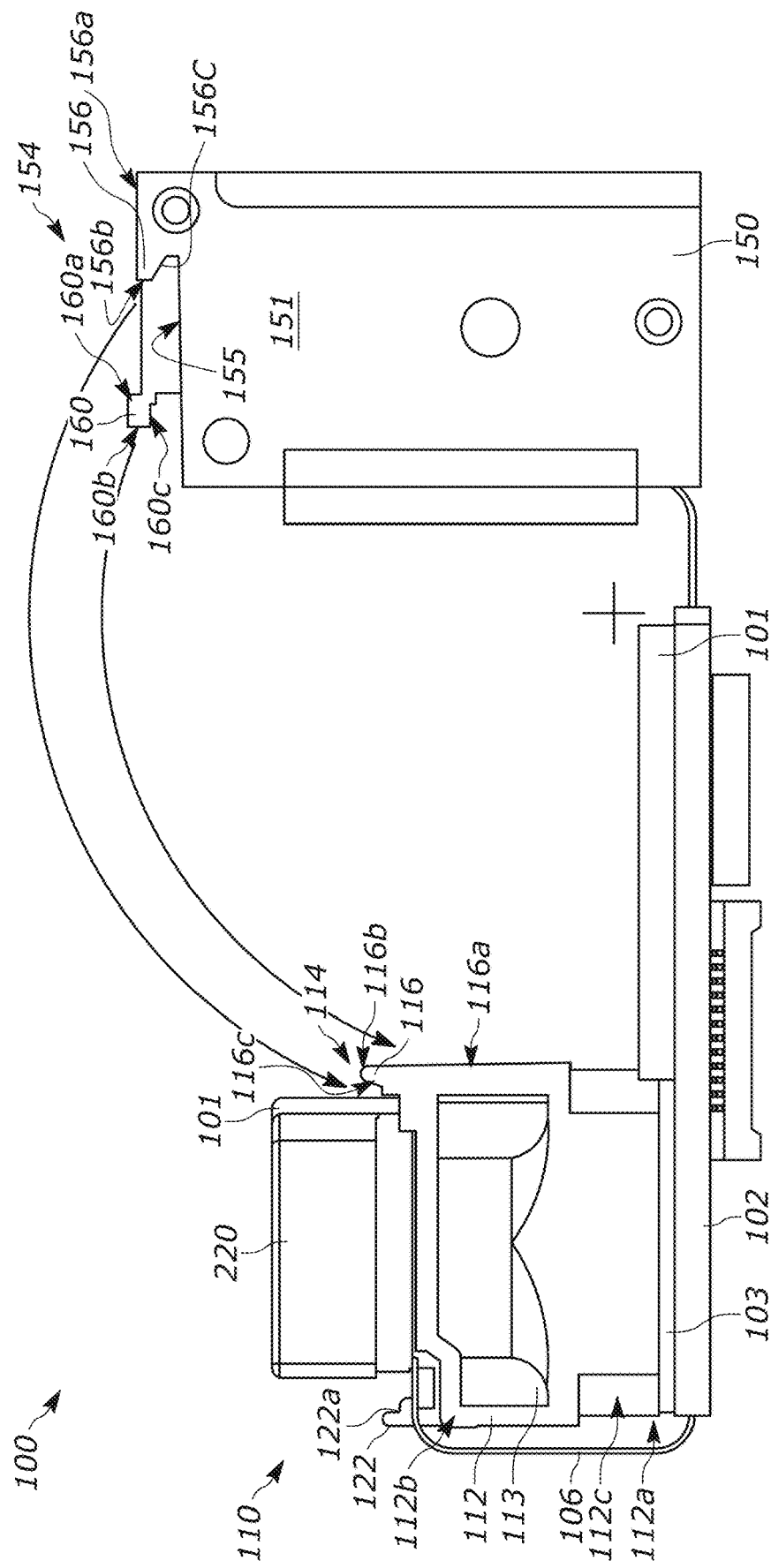
FIG. 5 illustrates a front elevation view of the example imaging assembly of FIGS. 1-4 during a manufacturing process in accordance with various embodiments.

With reference to FIG. 5, the assembly 100 is assembled by first coupling the imaging system 110 (i.e., the lower portion 112a of the rear lens holder 112) with the circuit board 102 (i.e., the component mounting portion 103). Next, the first flex tail connector 105 is coupled with the components disposed within the cavity or cavities 152 by inserting the end of the first flex tail connector 105 into the recessed portion 153 of the chassis 150. Next, the chassis 150 is positioned in the illustrated raised position relative to the circuit board 102. As indicated by the arrows in FIG. 5, the chassis 150 is rotated to a lowered position whereby the chassis mounting portion 154 couples with the lens holder mounting portion 114. More specifically, the curved lower surface 160b of the lower hook 160 of the chassis 150 enters the cavity 117 formed by the lens holder mounting portion 114 and engages the corresponding upper surface 120b of the lower tab 120 of the rear lens holder 112, and the lower surface 156b of the upper hooks 156 of the chassis 150 engage the corresponding curved upper surface 116b of the upper tabs 116 of the rear lens holder 112. As such, the chassis 150 may be rotated to its final position while hinging around the flex tail connector 105 with the circuit board 102 without interference. In some examples, the widths of the cavity 117 and the lower hook 160 are dimensioned to create a close fit when coupled together.

Figure 6:
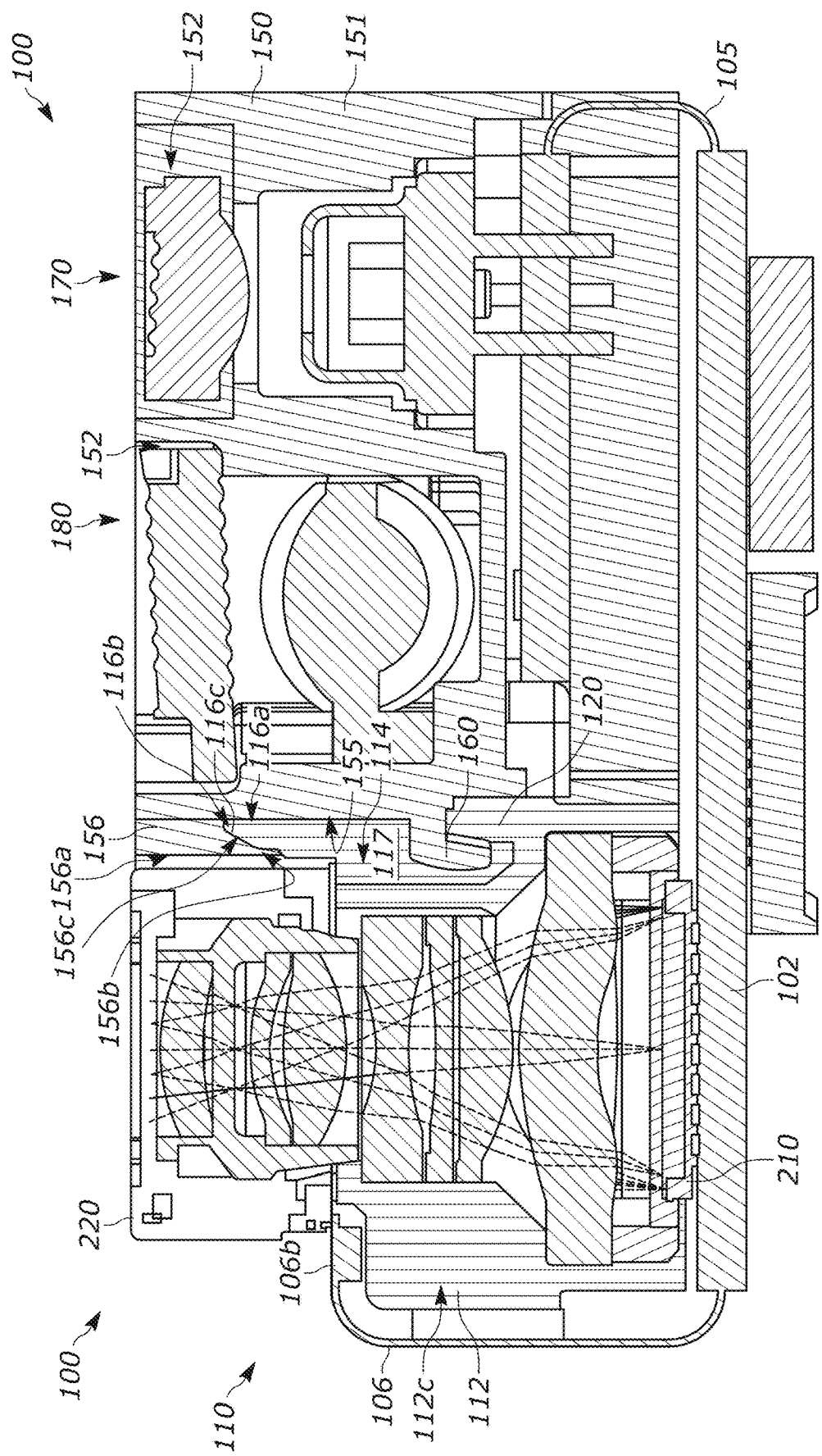
FIG. 6 illustrates a first front elevation cross-sectional view of the example imaging assembly of FIGS. 1-5 in accordance with various embodiments.
Figure 7:
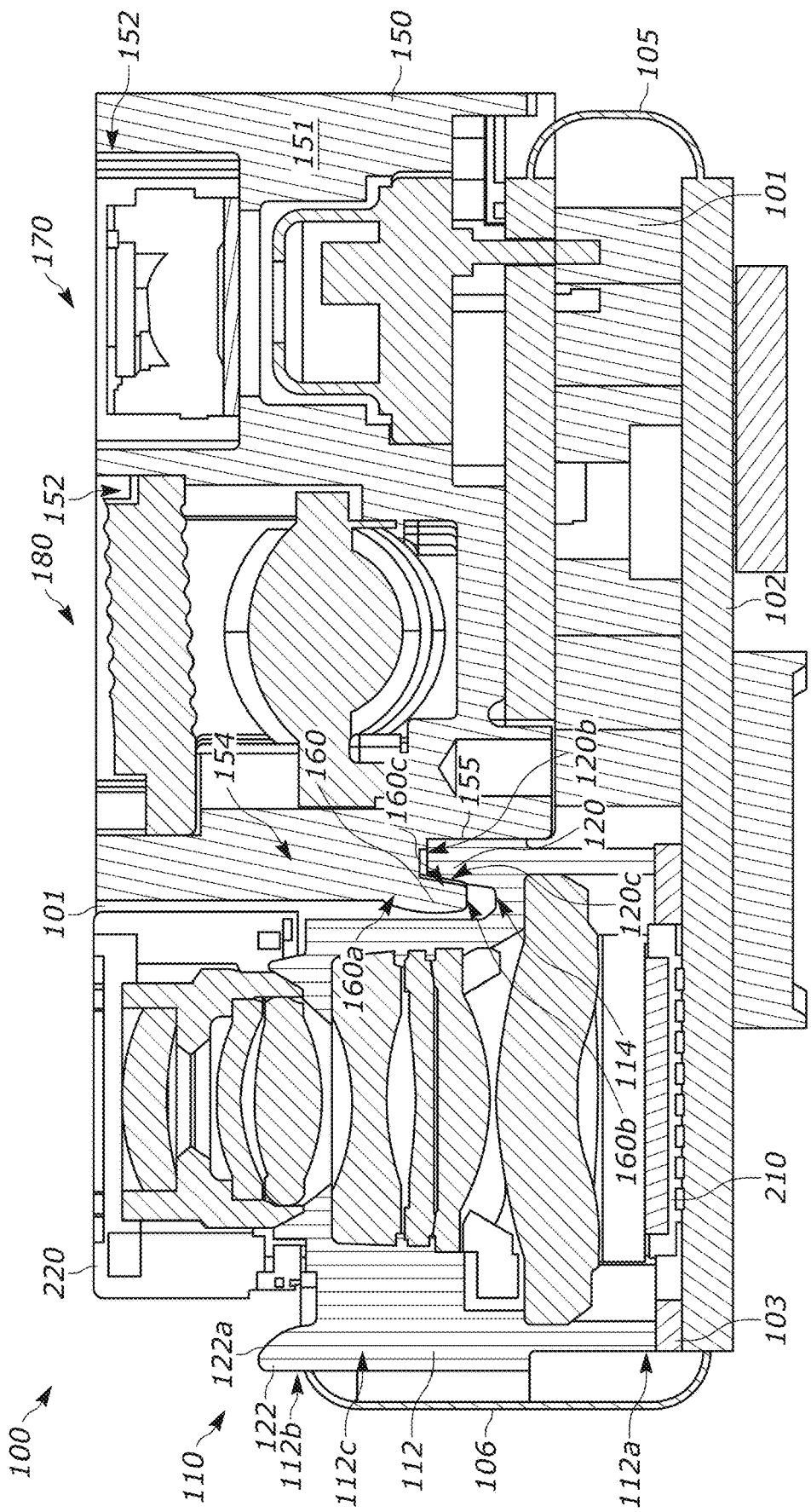
FIG. 7 illustrates a second front elevation cross-sectional view of the example imaging assembly of FIGS. 1-6 in accordance with various embodiments.

The lower tab 120 of the rear lens holder 112 and the lower hook 160 of the chassis 150 engage each other to move, urge, or squeeze the chassis 150 against the rear lens holder 112 (FIGS. 6 and 7), and the upper tabs 116 of the rear lens holder 112 and the upper hooks 156 of the chassis 150 act as wedges that slide against each other (via the angled surfaces 116c, 156c) until movement is restricted (FIG. 6).

In this arrangement, additional cavities may be formed between the lens holder mounting portion 114 and the chassis mounting portion 154. An epoxy or other adhesive 101 may be applied in these regions between the lens holder mounting portion 114 and the chassis mounting portion 154 to ensure the components may not move or separate relative to each other. In some of these examples, coupling of the lens holder mounting portion 114 and the chassis mounting portion 154 results in specified dimensional tolerances that may be filled by the epoxy or adhesive 101. Accordingly, there is a reduced requirement that the lens holder mounting portion 114 and the chassis mounting portion 154 be precisely mated with each other, thereby reducing manufacturing costs. In some examples, portions of the chassis 150 may include curved or cylindrical surfaces to assist with locating and rotating the chassis 150 into its relative lowered position. Further, in some examples, an epoxy material 101 may be added below or between the chassis 150 and the circuit board 102.

As a result of the mating coupling between the lens holder mounting portion 114 and the chassis mounting portion 150, the reference positioning surface 155 of the chassis 150 abuts the facing surface 116a of the upper tabs 116 of the chassis. By providing precise dimensions of the chassis 150 (and in turn, of the reference positioning surface 155), precise relative positioning of the imaging system 110 and the chassis 150 (in addition to the components disposed therein) is achieved. The plane-to-plane engagement of the chassis 150 and the imaging system 110 remove three degrees of freedom (i.e., left-right motion, tip, and tilt), while the engagement between the upper and lower tabs 116, 120 of the rear lens holder 110 and the upper and lower hooks 156, 160 of the chassis 150 remove an additional degree of freedom (i.e., vertical movement). The remaining degrees of freedom are eliminated by a surface of a fixture used during the curing process for the epoxy or other adhesive. After moving the chassis 150 into position, a nesting surface positioned behind the components illustrated in FIG. 5 will provide for remaining alignment, thus removing the remaining two degrees of freedom.

Figure 8:
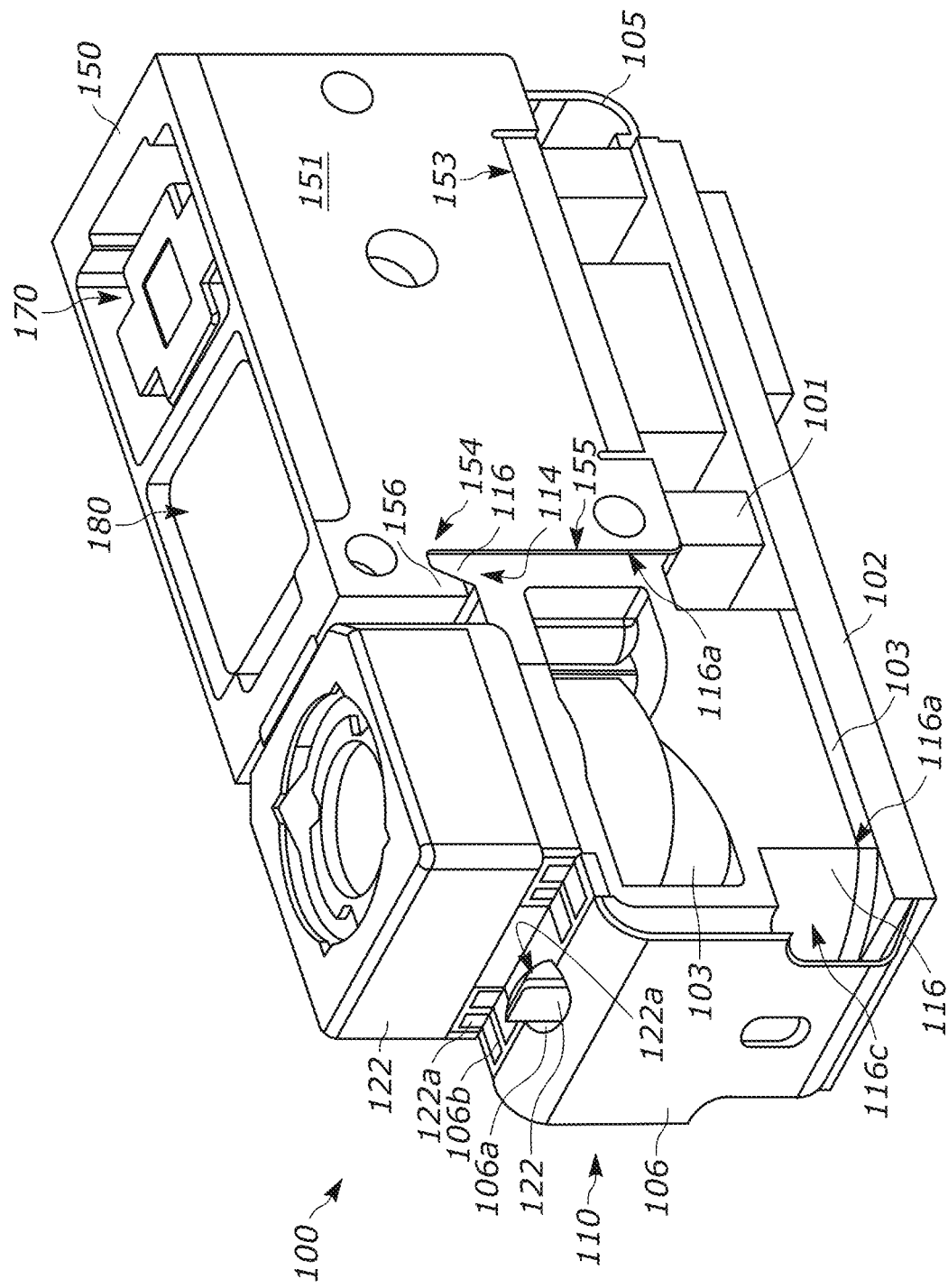
FIG. 8 illustrates a perspective view of the example imaging assembly of FIGS. 1-7 in accordance with various embodiments.

With reference to FIG. 8, the second flex tail connector 106 includes a mounting opening 106a and a number of interconnects 106b. The rear lens holder 112 includes a flex securing tab 122 that protrudes upwardly from the rear lens holder 112. The flex securing tab 122 includes an angled engaging surface 122a which is angled in a direction towards the autofocus system 220. When electrically coupling the autofocus system 220 with the circuit board, the second flex tail connector 106 is urged upward, and the mounting opening 106a is aligned with the flex securing tab 122. Because the engaging surface 122a of the flex securing tab 122 is angled towards the autofocus system 220, the interconnects 106b are moved or positioned against corresponding interconnects 220a positioned on the autofocus system 220, thereby communicatively coupling the autofocus system 220 with the circuit board 102. In some examples, the flex securing tab 122 may include a notch or other feature used to retain the second flex tail connector 106.

Figure 9:
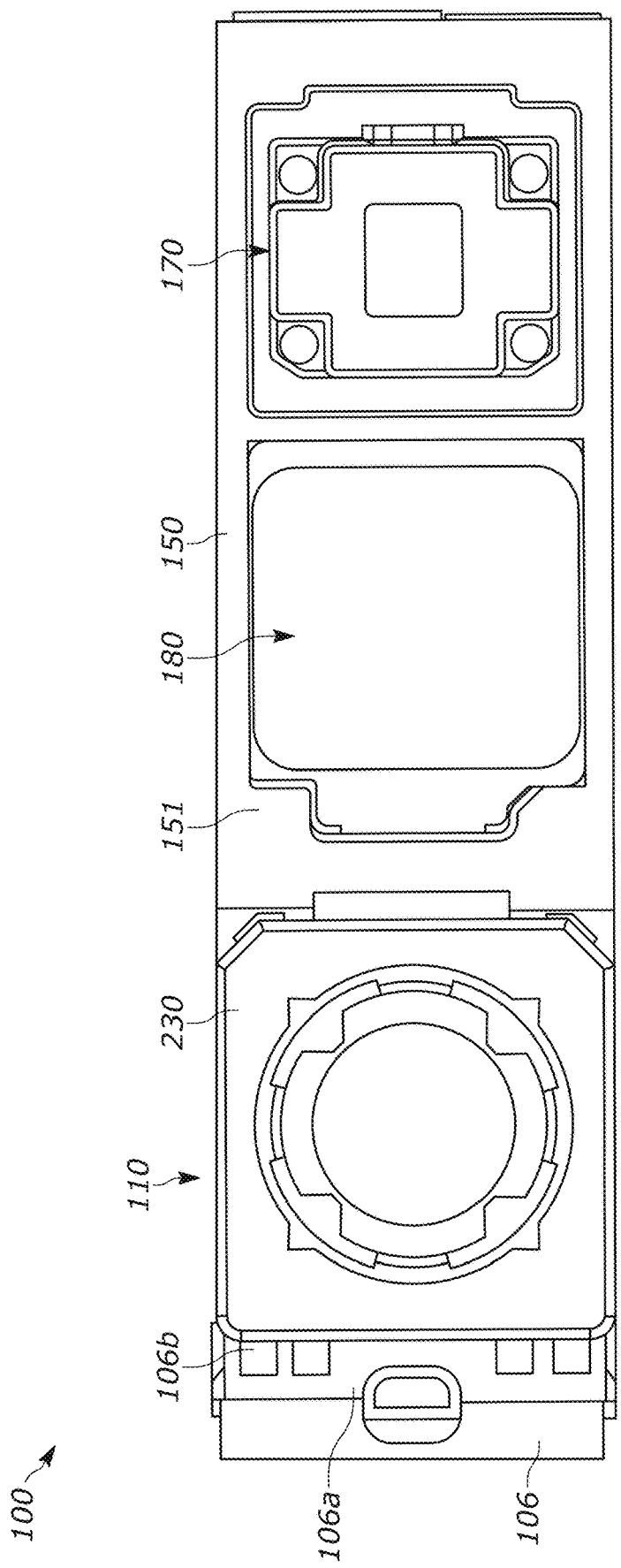
FIG. 9 illustrates a top plan view of the example imaging assembly of FIGS. 1-8 in accordance with various embodiments.

With reference to FIG. 9, the optical arrangement of the imaging system 110 and the autofocus system 220 will be described in greater detail.

So configured, and as illustrated in FIG. 9, the imaging system 110 described herein may occupy an entire available height between the opposing large flat mounting surfaces of the chassis 150 as compared with being constrained by the body 151 of the chassis 150. Further, instead of the chassis 150 being mounted directly to the circuit board 102, the imaging system 110 is mounted to the circuit board 102 while the chassis 150 is coupled with the imaging system 110. Advantageously, such an arrangement isolates heat of the aiming system 170 and the illumination system 180 disposed within the chassis 150 from the optical sensor mounted on the circuit board 102, while also provide for additional optical path length for the imaging system 110.

Figure 10:
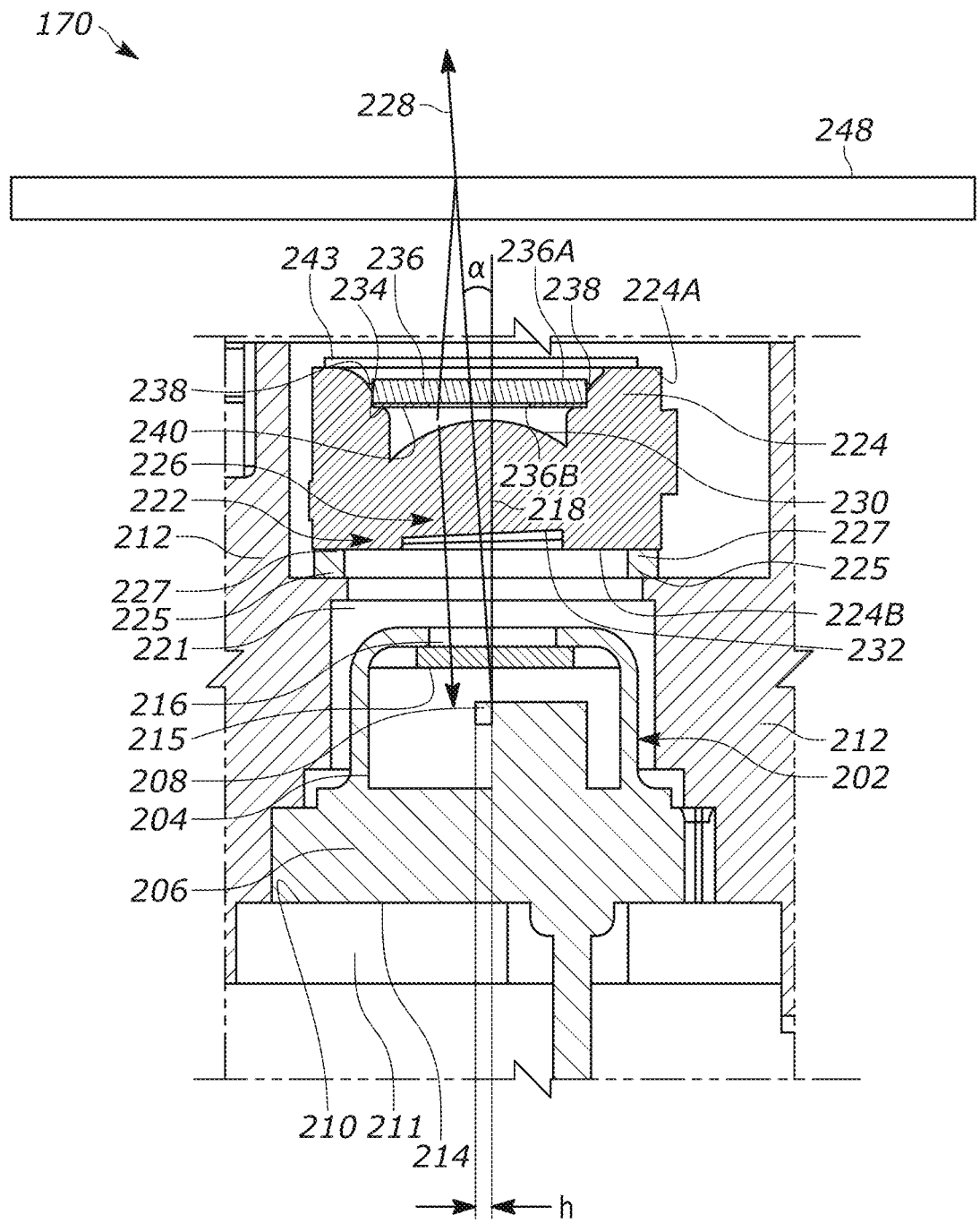
FIG. 10 illustrates a front elevation cross-sectional view of the example aiming system of FIGS. 1-9 in accordance with various embodiments.

FIG. 10 illustrates an example implementation of the aiming system 170. The aiming system 170 is configured to generate an aiming beam to serve as a visual guide for users during operation of the assembly 100, in particular for accurate positioning of the imaging system 110 and the illumination system 180. Whereas conventional aiming assemblies are able to generate bright, central aiming dots or patterns, they typically do so on an axis offset from that of the illumination system field of view and imaging system field of view. And for configurations where aiming assemblies are designed to tilt the axis of an aiming beam, the configurations are too large, requiring wedges or similar optics, to be compatible with integrated scanner assemblies, such as those described herein. In contrast, in various examples, aiming systems provide small stack height designs capable of generating aiming dot or aiming pattern axis tilt without increasing overall height of an integrated scanner assembly.

In the example of FIG. 10, aiming system 170 includes a beam source assembly 202 which has a frame 204 having a mounting plate 206 onto which a beam source 208 is positioned. The beam source 208 may be a laser or LED based beam source. In some examples, the beam source 208 is a vertical emitting beam source, such as a vertical cavity surface emitting laser. In some examples, the beam source 208 is a side emitting beam source or edge emitting beam source. The frame 204 may be an integrated piece having a mounting surface 210 mountable to a mounting surface 214 of a mounting plate 211, which may be formed with or attached to a chassis 212 to serve as a chassis mounting portion. In other examples, the frame 204 may be mounted (e.g., glued onto or pressed into) directly on the chassis 212, without a mounting plate 211. For example, walls of the lower cavity 221 may be sized to receive the mounting plate 206 of the fame 204 and fixedly retain the later in place. In some examples, the mounting plate 211 and/or the mounting plate 206 may provide heat dissipation function for the laser 208.

The frame 204 includes a transparent window 215 environmentally sealing the laser 208 and positioned adjacent an opening 216 that functions as an aperture through which the generated beam is provided along a beam axis 218. The frame 204 sits within a lower cavity 221 of the chassis 212.

In some examples, the lower cavity 221 may be environmentally sealed using a transparent window at an upper end (not shown). The chassis 212 further includes an outer cavity 223 having chassis mounting portions (surfaces) 225 onto which the collimator assembly 222 may be placed during assembly and held in place by an adhesive, such as a UV curable adhesive 227 surrounding a lower outer edge of the assembly 222.

The collimator assembly 222 is a low profile assembly having a body 224 that has an outer surface 224A and an inner surface 224B parallel thereto. The collimator assembly further includes a lens group 226 that is positioned between the outer surface 224A and the inner surface 224B. More particularly, the lens group 226 defines a tilt axis 228. In the illustrated example, that tilt axis 228 forms an acute angle relative the parallel outer and inner surfaces 224A, 224B. Further, the tilt axis 228 defines a tilt angle, $\alpha$, relative to the beam axis 218, which may also be considered a central axis. Further still, the lens group 226 is positioned relative to the beam source 208 such that a beam, incident along the beam axis 218, is deflected onto the tilt axis 228 by the lens group 226. In various examples, the tilt angle, $\alpha$, is confined by the expression as $\alpha > 0.5*a\tan(h/F)$, where F is a focal length of the lens group 226 and h is a clearance height of the beam source 208, so as to prevent back reflection of the beam from the an exit window back on to the beam source 208.

In various examples, the lens group 226 includes a first lens 230 at an exit end and a second lens 232 at an entrance end. Both of the lens 230 and 232 may be tilted, meaning having a central shared axis that is tilted related to the beam axis 218. In some examples, one or both of first lens 230 and second lens 232 is a semispherical lens, meaning a lens whose surface profile has at least a portion thereof formed of a sphere or cylinder. In some examples, one or both of the first lens 230 and the second lens 232 is an aspheric lens, meaning a lens whose surface profiles are not portions of a sphere or cylinder. In some examples, the lens group 226 may be formed of a double convex lens having a central axis tilted to be parallel with the axis 228. In some examples, the lens group 226 may be formed of a lens having symmetric aspheric surfaces, where the first lens 230 and the second lens 232 have aspheric curvatures expressed by: SAG $z=c*r^2/(1+\text{sqrt}(1-c^2*r^2))+A4*r^4+A6*r^6$, where for the lens 230, R=−1.67 mm, A4=0.0126 mm$^{-3}$, A6=−0.00215 mm$^{-5}$ and for the lens 232, R=13.61 mm, A4=−0.0163 mm$^{-3}$. In yet other some examples, the second lens 232 is implemented as a generally planar surface instead, e.g., a tilted planar face. In various examples, the lens group 226 is integrally formed from the body 224 such that it a continuous piece.

Figure 11A:
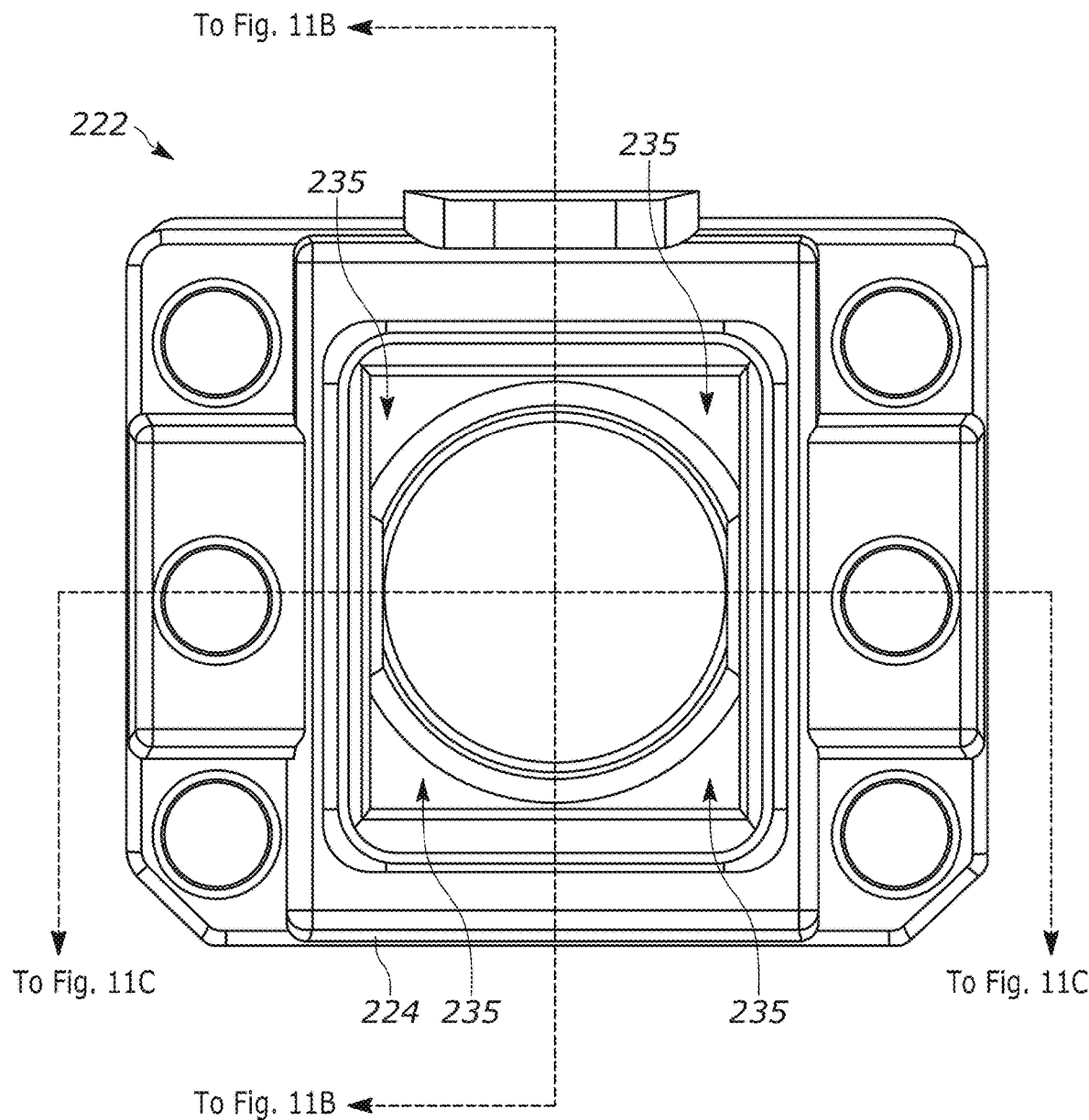
FIG. 11A illustrates a top view of a collimator assembly of the aiming system of FIG. 10 in accordance with various embodiments.
Figure 11B:
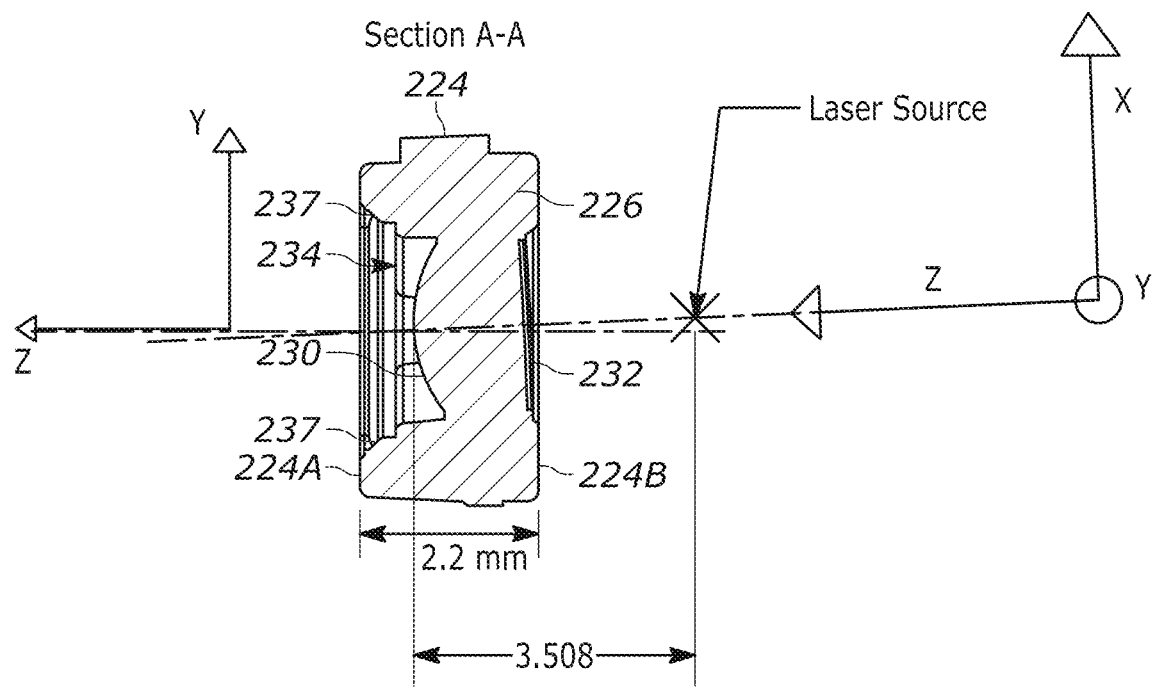
FIGS. 11B and 11C each illustrate a respective front elevation cross-section view taken along a different cross-section of the collimator assembly of FIG. 11A in accordance with various embodiments.
Figure 11C:
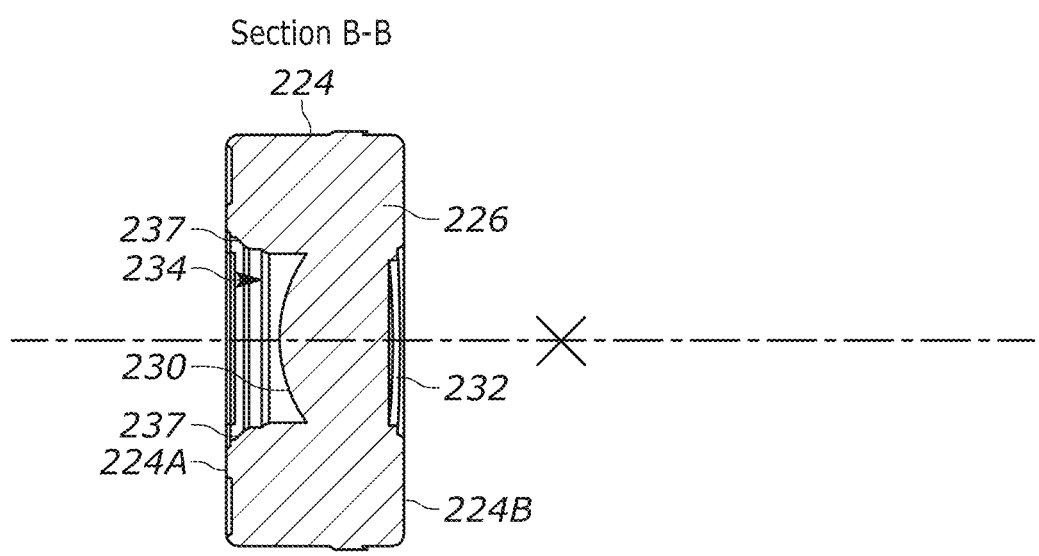

FIG. 11A illustrates a top view of the collimator assembly 222, with FIGS. 11B and 11C illustrating cross-sectional views thereof taken along different lines. The body 224 defines a recess 234 that extends below the outer surface 224A and provides a seating surface 235 for mounting an optical element 236 (see, FIG. 10). As shown in the examples of FIGS. 11B and 11C, the recess 234 may include a beveled lead in surface 237, which may be angled such as chamfer or curved such as a fillet, and provides for fast aligned seating of the optical element 236 during assembly and that provides a contact point for placing a sealing adhesive 238 (shown in FIG. 10) that retains the optical element 236 in place and provides environmental sealing of the region between it and the lens group 226. In some examples, the body 224 defines another seating surface 239, which may also include angled lead in surfaces, for seating an optical element aperture 240. During fabrication, the aperture 240 is placed within the recess 234 prior to placement of the optical element 236 and may be maintained in place by physical engagement with the optical element 236 and/or through an adhesive or other attachment mechanism. The aperture 240 defines an opening through which the deflected beam along axis 228 propagates, where the shape of the defined opening may be square, rectangular, circular, or any other suitable shape. In some examples, the diffractive optical element at inner surface 236B is coextensive with the shaping of the aperture opening only, while in other examples, the diffractive optical element extends over a larger portion of the inner surface 236B than the opening or a smaller portion than the opening. The aperture 240 may be centered about the axis 218, the axis 228, or centered otherwise so long as the aiming beam is able to be generated and, preferably, so long as the aperture is sized to prevent or substantially prevent stray light from entering into the lens 230.

Comparing FIGS. 11B and 11C, the tilt of the second lens 232 is visible along one cross-section and not visible along the other. In examples where the lens group 226 is formed of other structures, such as curved aspheric surfaces, the tile may be different or there may be no tilt. A sample positioning of the beam source 208 is illustrated, as well. Preferably, the height of the collimator assembly 222 is 3 mm or less, preferably 2.5 mm or less, and more preferably, in the illustrated example, is 2.2 mm, measured from an outer surface 224A and an inner surface 224B. Further, in some examples, the center axis of the recess 234 coincides with the center axis of the lens group 226 and the center axis of the body 224 and with the beam axis 218.

As shown in FIG. 10, in various examples, the optical element 236 is a diffractive optical element and that may have a planar outer surface 236A and a diffractive element at an inner surface 236B, the latter being positioned to receive the input beam from the lens group 226. The sealing adhesive 238, therefore, not only retains the optical element 236 in the recess 234, but further provides environmental sealing that prevents contamination of the diffractive element located at the inner surface 236B. In other examples, the optical element 236 may be a refractive optical element or a combination of diffractive and refractive elements. The optical element 236 is configured to convert the input beam into an aiming pattern that appears at a focal distance of the lens group 226. This configuration provides a compact design while still allowing for converting an input beam into a complex beam pattern at the far field, where such patterns can be geometric shapes, such as squares, rectangles, circles, etc. but also more complex shapes such as logos, text, pictures, etc. The optical element 236, as part of the lens group 226, may further cooperate with the aspheric surface 230 to collimate the incident input beam along with tilting the propagation axis that beam. An optical element retainer 243, also termed an eye-safety retainer, is affixed to the upper surface 224A, e.g., using an adhesive, to provide further protection against dislodging of the optical element 236 from the aiming system 170. The retainer 243 may include an aperture positioned and sized to allow transmission of the deflected aiming beam, where the remainder of the retainer 243 may be non-transparent. The retainer 243, for example, may be formed with a black material or other opaque medium or even a partially transmitting medium such as a diffuser. The retainer 243, therefore, passes the deflected aiming beam through its aperture but otherwise blocks or minimizes back reflections and stray light from entering the lower cavity 221 and impinging on the laser 208 and causing spurious reflections and brightness flares. The retainer 243 additional prevents from the optical element 236 from dislodging from being in the path of the deflected aiming beam, in the event the adhesive 238 fails. The In some examples, the optical element retainer 243 further includes sensing electrodes positioned thereon to allow an external circuit to determine if the window itself has been dislodged (e.g., in response to a received signal, a change in measured impedance, or other electrical detection) providing a warning signal to an operator.

In various examples, a beam forming aperture 240 is placed first in the recess 234 to provide shielding of the lens group 222 against extraneous off axis back scattering light, ambient light, or other illumination. The optical element 236 may then be placed on top of that aperture 240.

Figure 12B:
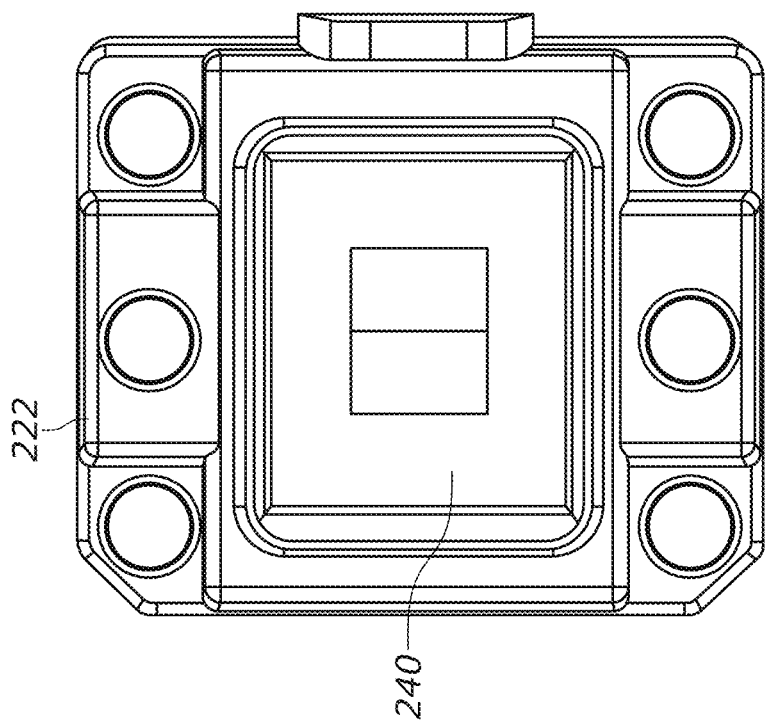
FIGS. 12A-12E illustrate top plan views of respective steps in an example assembly process to form the collimator assembly of FIGS. 11A-11C in accordance with various embodiments.
Figure 12A:
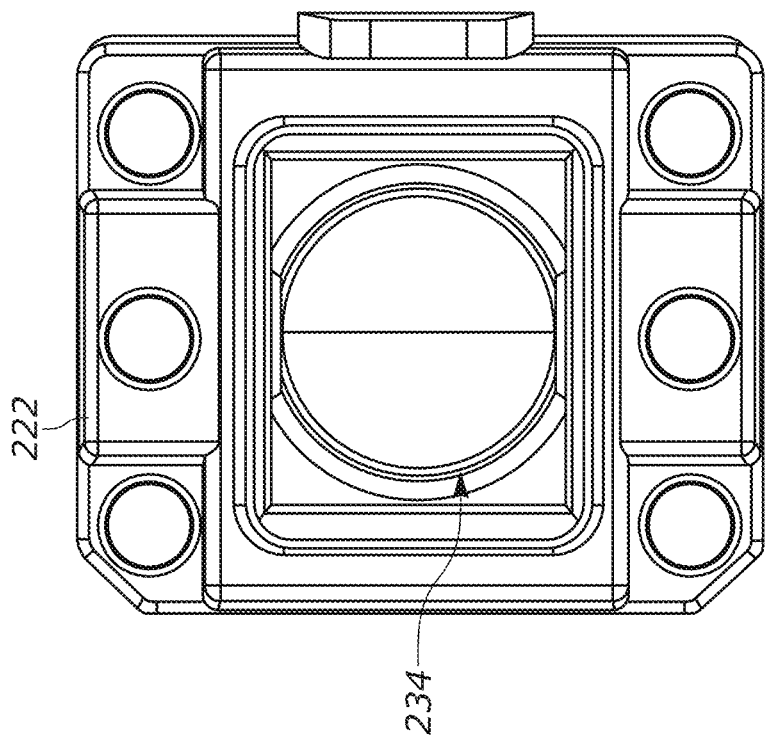
Figure 12D:
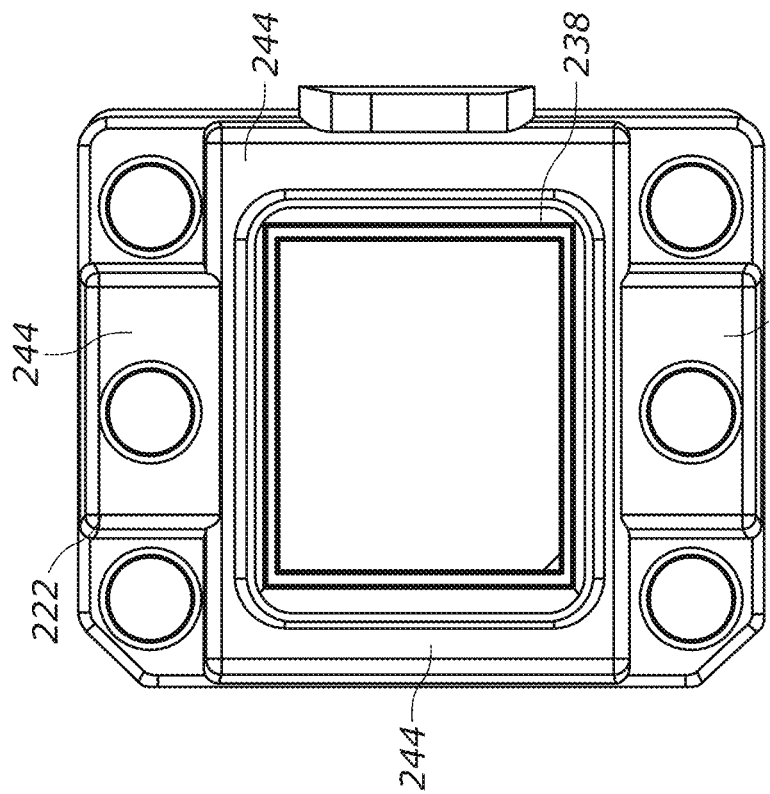
Figure 12C:
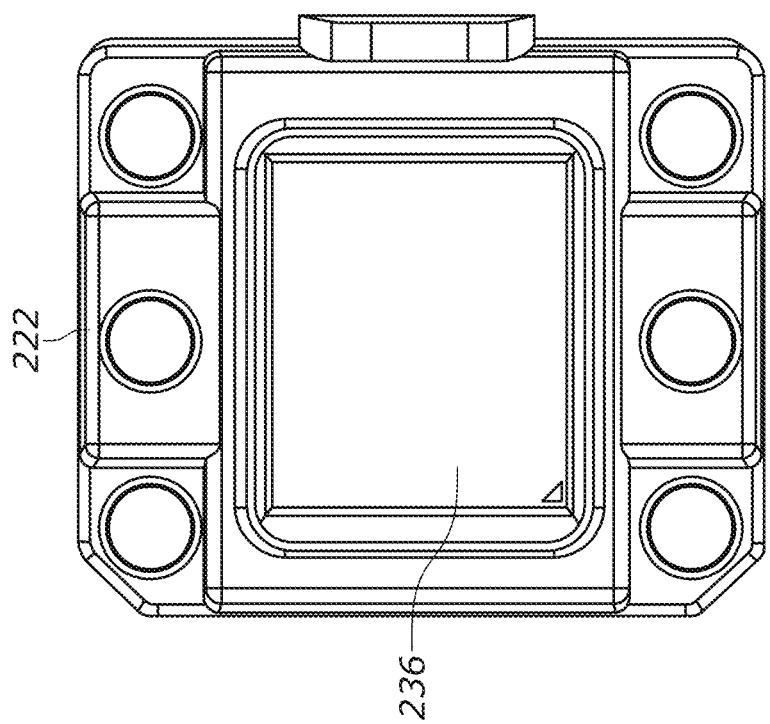
Figure 12E:
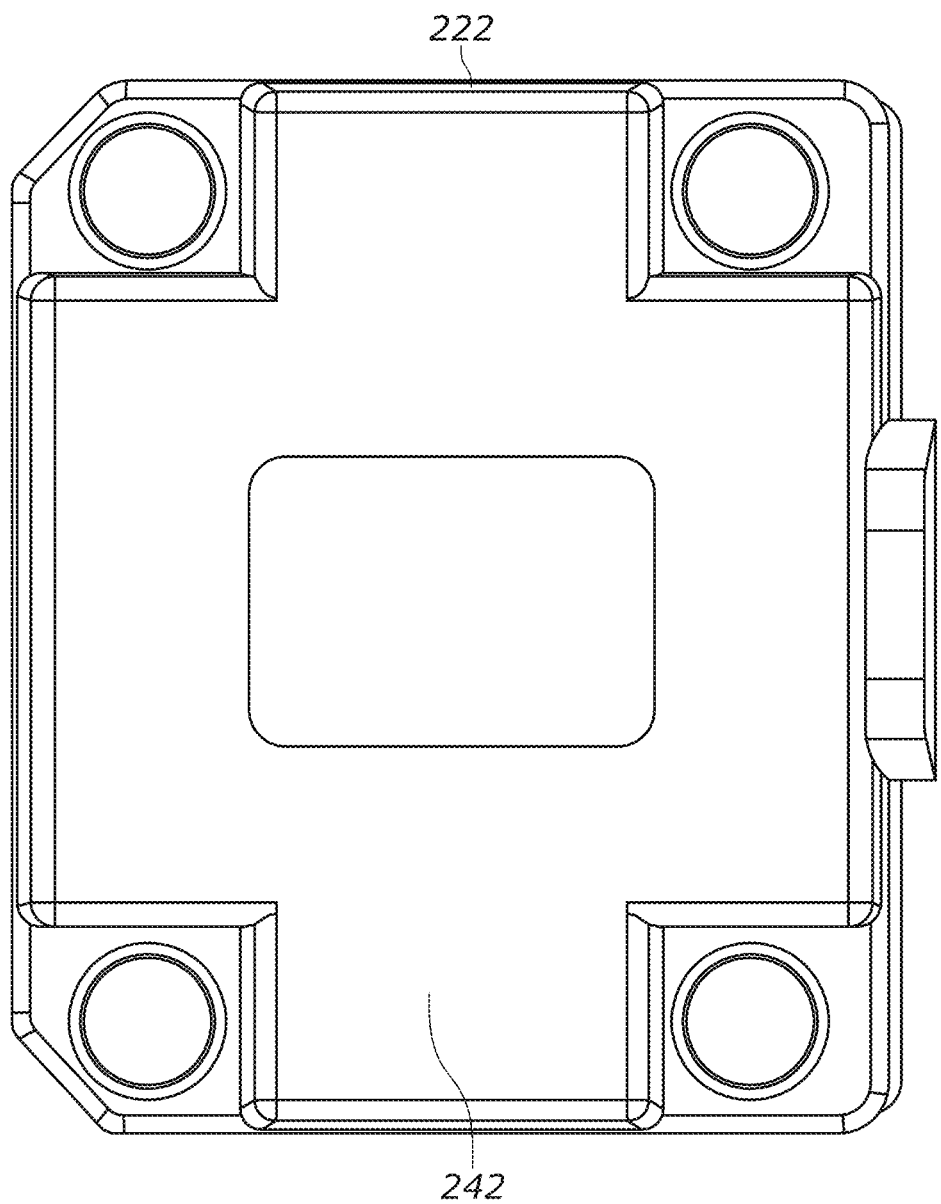
Figure 12F:
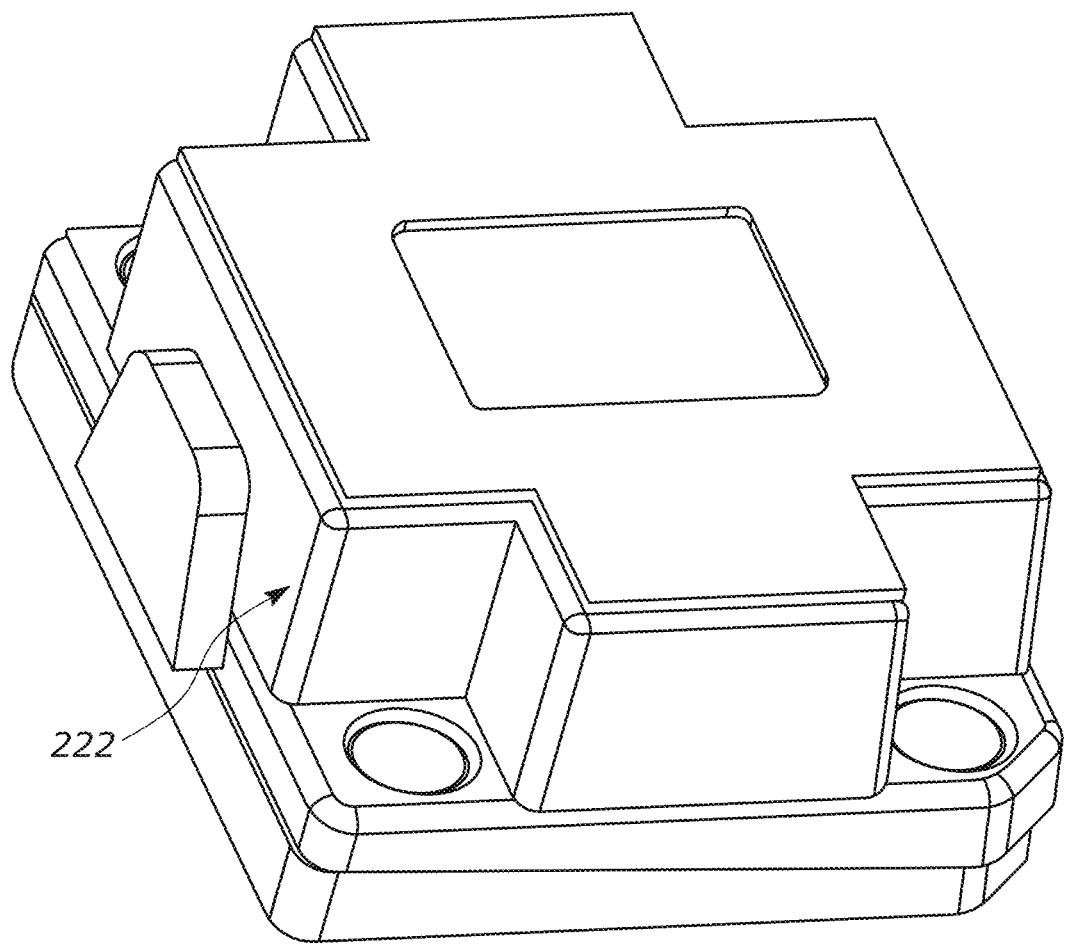
FIG. 12F illustrates a perspective view of the resulting assembled collimator assembly in accordance with various embodiments.

FIGS. 12A-12E illustrate different assembly steps according to an example method of assembling an aiming system. FIG. 12A illustrates the collimator assembly 222 from a top view. As a next assembly step shown in FIG. 12B, a beam forming aperture 240 is placed at a bottom of the recess 234. The aperture 240 may be fixed in place by an adhesive or other fixing means, or the aperture 240 may be maintained in place by the seating surface of the recess 234. At next step shown in FIG. 12C, the optical element 236 is placed in the recess 234 on top of the aperture 240 and sealed in place with the sealing glue 238 that surrounds a periphery of the optical element 236, as shown in FIG. 12D, thereby creating a hermetic seal with a lens group. At a next assembly step, shown in FIG. 12E, an optical element retainer 242 is seated an outer recess defined by seating surfaces 244 and provides further structural support of the optical element in place on the body 224. FIG. 12F shows an assembly collimator assembly 222 during an active alignment process. The collimator assembly 222 may be moved in a z-axis, x-axis, and/or y-axis direction while the beam source assembly (not shown) is affixed in place on a chassis (not shown) and is generating an input beam. A detector (not shown) is positioned at a distance from the collimator assembly 222 to detect an output beam and determine when the collimator assembly 222 is in the desired position relative to the beam source assembly. When a sufficient output beam condition is met, e.g., a sufficient beam focusing at the detector, a sufficient beam pattern is generated at the detector, a sufficient beam intensity is detected at the detector, or otherwise, then the collimator assembly 222 may be affixed in place to the chassis 212, for example, by ultraviolet curing an adhesive mounting the assembly 222 in an upper cavity of the chassis. This process is termed active alignment. The assembly process includes proper alignment (e.g., using active alignment) between the collimator assembly at the beam source by positioning the collimator assembly above the beam source to deflect an input beam from propagation along the central axis to propagation along a tilt axis having a tilt angle, α, relative to the central axis. Further a transparent window 248 may be mounted to an exit end of the chassis 212, above the collimator assembly, for transmission of the aiming pattern along the tilt axis. Further still, the beam source 208 may be mounted to a circuit board, where assembly further includes mounting the circuit board to the mounting surface 214 of the chassis 212.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions.

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. An aiming system comprising:
a beam source assembly having a mounting plate and a beam source for generating an input beam from an exit surface, the exit surface defining a central axis along which the input beam is to propagate;
a collimator assembly having a body defining an outer surface and an inner surface parallel thereto, the collimator assembly having a lens group disposed between the outer surface and the inner surface, wherein the lens group defines a tilt axis forming an acute angle to the parallel outer and inner surfaces and wherein the tilt axis has a tilt angle, $\alpha$, relative to the central axis, the lens group positioned to deflect the input beam from the central axis onto the tilt axis,
the collimator assembly further having a recess positioned above the lens group and having an optical element sealably mounted within the recess to convert the input beam into an aiming pattern at a focal distance of the lens group; and
a chassis defining an outer cavity within which the collimator assembly is mounted and an inner cavity within which beam source is mounted.

2. The aiming system of claim 1, wherein the lens group comprises first and second symmetric aspheric lens.

3. The aiming system of claim 1, wherein the lens group comprises an aspheric lens at an exit end and a tilted planar face at an entrance end.

4. The aiming system of claim 1, wherein the lens group comprises a double convex lens.

5. The aiming system of claim 1, wherein the lens group is integrally formed from the body of the collimator assembly.

6. The aiming system of claim 1, wherein the angle, $\alpha$, is defined as $$\alpha > 0.5 * a\tan(h/F),$$

where F is a focal length of the lens group of the collimator and h is a clearance height of the beam source.

7. The aiming system of claim 1, wherein the optical element is a diffractive optical element.

8. The aiming system of claim 7, wherein the different optical element has a planar outer surface and a diffractive element inner surface positioned to receive the input beam from the lens group.

9. The aiming system of claim 1, wherein the optical element is a refractive optical element.

10. The aiming system of claim 1, the collimator assembly further having a beam forming aperture positioned in the recess, and where the optical element is sealably mounted to the beam forming aperture.

11. The aiming system of claim 10, wherein the beam forming aperture is centered on the central axis.

12. The aiming system of claim 1, the collimator assembly further having an optical element retainer affixed to the outer surface of the body of the collimator assembly.

13. The aiming system of claim 1, wherein the collimator assembly has a height of 2.5 mm or less.

14. The aiming system of claim 13, wherein the collimator assembly has a height of 2.2 mm.

15. The aiming system of claim 1, wherein the body of the collimator assembly is centered on the central axis.

16. The aiming system of claim 1, wherein the beam source assembly is mounted to a chassis mounting portion to extend into the inner cavity.

17. The aiming system of claim 1, wherein the chassis has a height of 7 mm to 7.5 mm.

18. A method of assembling an aiming system for generating an aiming pattern on an object in a field of view (FOV), the method comprising:
providing a collimator assembly having a body defining an outer surface and an inner surface parallel thereto, the collimator assembly further having a lens group between the outer surface and the inner surface, wherein the lens group defines a tilt axis forming an acute angle to the parallel outer and inner surfaces, the collimator assembly further having a recess extending from the outer surface;

positioning an optical element in the recess and sealing the optical element in the recess to create a hermetic seal with the lens group, the optical element to convert an input beam into an aiming pattern at a focal distance of the lens group; and positioning the collimator assembly above a beam source assembly to generate the input beam from a beam source, the beam source defining a central axis such that the input beam from the beam source is deflected from the central axis to the tilt axis by the lens group, wherein the tilt axis has a tilt angle, $\alpha$, relative to the central axis; and mounting the collimator assembly and the beam source assembly to a chassis.

19. The method of claim 18, further comprising:

prior to positing the optical element in the recess, positioning a beam forming aperture at a bottom of the recess, the method further comprising sealing the optical element against the beam forming aperture.

20. The method of claim 19, wherein the beam forming aperture is centered on the central axis.

21. The method of claim 18, further comprising:

affixing an optical element retainer to the outer surface of the body.

22. The method of claim 18, wherein positioning the collimator assembly above the beam source assembly to generate the input beam comprises:

providing the chassis defining an outer cavity having a mounting portion and an inner cavity opposite the outer cavity;

affixing the collimator assembly within the outer cavity to the mounting portion; and affixing the beam source within the inner cavity.

23. The method of claim 22, further comprising actively aligning the collimator assembly above the beam source assembly by:

with the beam source affixed within the inner cavity, adjusting the position of the collimator assembly in a z-axis direction, in an x-axis direction, and/or in a y-axis direction during generation of the input beam until a sufficient output beam condition is met; and affixing the collimator assembly at the resulted adjusted position.

24. The method of claim 22, wherein the beam source assembly is mounted to a mounting plate of the chassis at an entrance end of the inner cavity.

25. The method of claim 18, wherein the lens group comprises first and second symmetric aspheric lens, an aspheric lens at an exit end and a tilted planar face at an entrance end, or a double convex lens.

26. The method of claim 18, wherein the lens group is integrally formed within the body.

27. The method of claim 18, wherein the angle, $\alpha$, is defined as $\alpha > 0.5 * a \tan(h/F)$, where F is a focal length of the lens group of the collimator and h is a clearance height of the beam source.

28. The method of claim 18, wherein the optical element is a diffractive optical element having a planar outer surface and a diffractive element inner surface positioned to receive the input beam from the lens group.

29. The method of claim 18, wherein the collimator assembly has a height of 2.5 mm or less.

30. The method of claim 18, wherein the collimator assembly has a height of 2.2 mm.

* * * * *